US010066992B2

(12) United States Patent
Ando et al.

(10) Patent No.: US 10,066,992 B2
(45) Date of Patent: Sep. 4, 2018

(54) PHOTODETECTOR OUTPUT CORRECTION METHOD USED FOR SPECTROSCOPIC ANALYZER

(71) Applicant: HORIBA, Ltd., Kyoto (JP)

(72) Inventors: Yoshitake Ando, Kyoto (JP); Katsumi Nishimura, Kyoto (JP); Yukio Sakai, Kyoto (JP)

(73) Assignee: Horiba, Ltd., Kyoto (JP)

( * ) Notice: Subject to any disclaimer, the term of this patent is extended or adjusted under 35 U.S.C. 154(b) by 122 days.

(21) Appl. No.: 15/218,580

(22) Filed: Jul. 25, 2016

(65) Prior Publication Data
US 2017/0023408 A1 Jan. 26, 2017

(30) Foreign Application Priority Data

Jul. 24, 2015 (JP) .................................. 2015-146359

(51) Int. Cl.
G01J 3/00 (2006.01)
G01J 3/02 (2006.01)
G01J 3/453 (2006.01)
G01J 3/28 (2006.01)
G01J 3/45 (2006.01)

(52) U.S. Cl.
CPC .............. G01J 3/0297 (2013.01); G01J 3/28 (2013.01); G01J 3/45 (2013.01); G01J 3/453 (2013.01)

(58) Field of Classification Search
CPC .... G01J 3/0297; G01J 3/28; G01J 3/45; G01J 3/453
See application file for complete search history.

(56) References Cited

U.S. PATENT DOCUMENTS 6,147,762 A * 11/2000 Haschberger ............. G01J 3/45
356/451
6,359,278 B1 * 3/2002 Graham ............. G01N 21/3504
250/339.09

(Continued)

FOREIGN PATENT DOCUMENTS

JP 11-023367 A 1/1999
JP 2015-087108 A 5/2015

OTHER PUBLICATIONS

EESR dated Jan. 24, 2017 issued for European Patent Application No. 16 180 886.0, 10 pgs.

(Continued)

Primary Examiner — Marcus Taningco
(74) Attorney, Agent, or Firm — Brooks Kushman P.C.

(57) ABSTRACT

The present invention is adapted to make light beams emitted from a light source enter a photodetector both when interposing an optical element having known characteristics and when not interposing the optical element, and acquire a first output value and a second output value that are the output values of the photodetector with respect to each of light beams that respectively have predetermined multiple wavenumbers and are included in the incident light beams, and obtain an arithmetic expression for calculating intensity of incident light beams from an output value of the photodetector, using parameters that are a ratio between the first output value and the second output value at each of the predetermined wavenumbers and the wavenumber transmission or reflection characteristic of the optical element.

6 Claims, 6 Drawing Sheets

(56) References Cited

U.S. PATENT DOCUMENTS

| | | | | |
|---|---|---|---|---|
| 6,512,223 B1* | 1/2003 | Wynn | ............. | G01J 1/08 |
| | | | | 250/226 |
| 2002/0110376 A1* | 8/2002 | MacLean | ............. | G03B 17/48 |
| | | | | 396/429 |
| 2002/0131047 A1* | 9/2002 | Zarrabian | ............. | G01J 3/02 |
| | | | | 356/454 |
| 2006/0118726 A1* | 6/2006 | Kawabata | ............. | G01N 21/359 |
| | | | | 250/358.1 |
| 2008/0094623 A1* | 4/2008 | Schuurmans | ............. | G01J 3/04 |
| | | | | 356/306 |
| 2014/0253921 A1* | 9/2014 | Chen | ............. | G01J 3/0297 |
| | | | | 356/416 |

OTHER PUBLICATIONS

M. C. Abrams et al., Practical Example of the Correction of Fourier-Transform Spectra for Detector Nonlinearity, Applied Optics, vol. 33, Sep. 20, 1994, pp. 6307-6314.

Pascal Jeseck et al., Detector Nonlinearity Correction Scheme for the LPMA Balloonborne Fourier Transform Spectrometer, Applied Optics, vol. 37, No. 27, Sep. 20, 1998, p. 6544.

* cited by examiner

PHOTODETECTOR OUTPUT CORRECTION METHOD USED FOR SPECTROSCOPIC ANALYZER

CROSS-REFERENCE TO RELATED APPLICATION

This application claims priority to JP Application No. 2015-146359, filed Jul. 24, 2015, the disclosure of which is incorporated in its entirety by reference herein.

TECHNICAL FIELD

The present invention relates to a photodetector output correction method used for a spectroscopic analyzer such as an FTIR or a spectroscope, and the like.

BACKGROUND ART

A spectroscopic analyzer such as an FTIR analyzes sample components on the basis of a wavenumber intensity distribution (optical spectrum) of light beams passing through a sample. In order to detect the intensity of the light beams passing through the sample, a photodetector such as a MCT photodetector is used. However, it is of course required to obtain the relationship (calibration curve) between the output value of the photodetector and the intensity of the incident light beams before analyzing.

Therefore, conventionally, a calibration curve has been prepared by making predetermined reference light beams enter a photodetector to obtain the output value of the photodetector.

SUMMARY OF INVENTION

Technical Problem

In the case of an MCT photodetector as an example, when the intensity of incident light beams is equal to or less than a predetermined value, the relationship between the output value of the photodetector and the incident light intensity is linear (proportional relationship), as illustrated in FIG. 1. Thus, in this range, a calibration curve can be relatively easily prepared because it is only necessary to obtain an offset and a span.

However, when the incident light intensity becomes more than the predetermined value, the relationship becomes nonlinear as illustrated in the same diagram. And, in order to obtain an accurate calibration curve, many reference light beams having different intensities must be prepared to measure output values corresponding to the reference light beams. Specifically, the measurement must be performed at multiple points (e.g., 10 points or more). And, it takes approximately 10 minutes to perform measurement at one point. As a result, there occur problems that considerable many man-hours (time), e.g., several hours, are required only for preparing the calibration curve, and a certain level of equipment is also required.

In addition, in terms of the man-hour and the equipment, at the time of maintenance or repair, there also occurs a problem that checking and/or re-preparing the calibration curve at the destination of product delivery are difficult.

Further, these are problems not only occurring in the MCT photodetector but also common to the other types of photodetectors.

The present invention is made in order to solve the above-described problems at once. The principal purpose is that it becomes possible to correct the output of a photodetector (prepare a calibration curve for the photodetector) used for a spectroscopic analyzer or a spectroscope in a short period of time with a simple configuration.

Solution to Problem

That is, a photodetector output calculation method according to the present invention is one used for a spectroscopic analyzer or a spectroscope including a light source, a spectroscopic part that disperses light beams emitted from the light source, and a photodetector for measuring the intensity of the light beams exiting from the spectroscopic part, wherein the photodetector is adapted such that the relationship between incident light intensity and an output value is substantially linear within a predetermined range, and the photodetector output calculation method includes:

making the light beams emitted from the light source enter the photodetector interposing an optical element having a known wavenumber transmission characteristic or a known wavenumber reflection characteristic so as to make intensity of the light beams fall within the range, and acquiring a first output value as an output value of the photodetector with respect to each of light beams that have predetermined multiple wavenumbers and are included in the incident light beams;

making the light beams emitted from the light source enter the photodetector without interposing the optical element, and acquiring a second output value as an output value of the photodetector with respect to each of light beams that respectively have the predetermined wavenumbers and are included in the incident light beams; and using a ratio between the first output value and the second output value at each of the predetermined wavenumbers and the wavenumber transmission or reflection characteristic of the optical element as parameters to obtain an arithmetic expression for calculating intensity of incident light beams from an output value of the photodetector.

Note that the arithmetic expression refers to not only an expression for calculating the intensity of incident light beams from the output value of the photodetector but also a concept including a map, a lookup table, and the like, and may be reworded as a calibration curve. In addition, a wavenumber is assumed to also include a wavelength that is the reciprocal of the wavenumber.

Specifically, when the arithmetic expression is C(y), the value of the following expression 1 comprises a value indicating the wavenumber transmission characteristic or wavenumber reflection characteristic of the optical element F given in (k) it can be exemplified as a range.

$$Y_1(k)/\{C(y)Y_2(k)\} \quad (1)$$

where k represents a wavenumber, $Y_1(k)$ represents the first output value, $Y_2(k)$ represents the second output value, $F(k)$ represents the wavenumber transmission characteristic or the wavenumber reflection characteristic of the optical element, y represents the output value of the photodetector, and C(y) represents the arithmetic expression.

Also, a spectroscopic analyzer or a spectroscope according to the present invention includes a light source, a spectroscopic part that disperses light beams emitted from the light source, and a photodetector that detects light beams exiting from the spectroscopic part, wherein the photodetector is adapted such that the relationship between incident light intensity and an output value is substantially linear within a predetermined range, and the spectroscopic analyzer or the spectroscope further includes:

an output value acquisition part that when making the light beams emitted from the light source enter the photodetector interposing an optical element having a known wavenumber transmission characteristic or a known wavenumber reflection characteristic so as to make intensity of the light beams fall within the range, acquires a first output value as an output value of the photodetector with respect to each of light beams that have predetermined multiple wavenumbers and are included in the incident light beams, and also when making the light beams emitted from the light source enter the photodetector without interposing the optical element, acquires a second output value as an output value of the photodetector with respect to each of light beams that respectively have the predetermined wavenumbers and are included in the incident light beams; and an arithmetic expression calculation part that uses the ratio between the first output value and the second output value at each of the predetermined wavenumbers and the wavenumber transmission characteristic or wavenumber reflection characteristic of the optical element as parameters to calculate an arithmetic expression for calculating intensity of incident light beams from an output value of the photodetector.

As a simple mechanism for acquiring the first output value and the second output value, the following mechanism can be cited. The mechanism is a supporting mechanism that selectively moves the optical element to any of a first position where the optical element is positioned in an optical path from the light source to the photodetector and a second position where the optical element is withdrawn from the optical path.

As a preferable optical element for making the incident light intensity fall within the predetermined range, a bandpass filter can be cited.

Advantageous Effects of Invention

According to the present invention configured as described above, only by interposing the optical element having known wavenumber transmission or reflection characteristics, the arithmetic expression for calculating the intensity of incident light beams from the output value of the photodetector can be obtained.

In addition, work necessary for obtaining the arithmetic expression is only to perform a measurement operation when interposing the optical element and when not interposing the optical element. And, equipment necessary for the work only includes the optical element and its accessories. As a result, a photodetector output correction expression used for the spectroscopic analyzer, i.e., the arithmetic expression can be prepared in a short period of time with a simple configuration.

DESCRIPTION OF EMBODIMENTS

Figure 1:
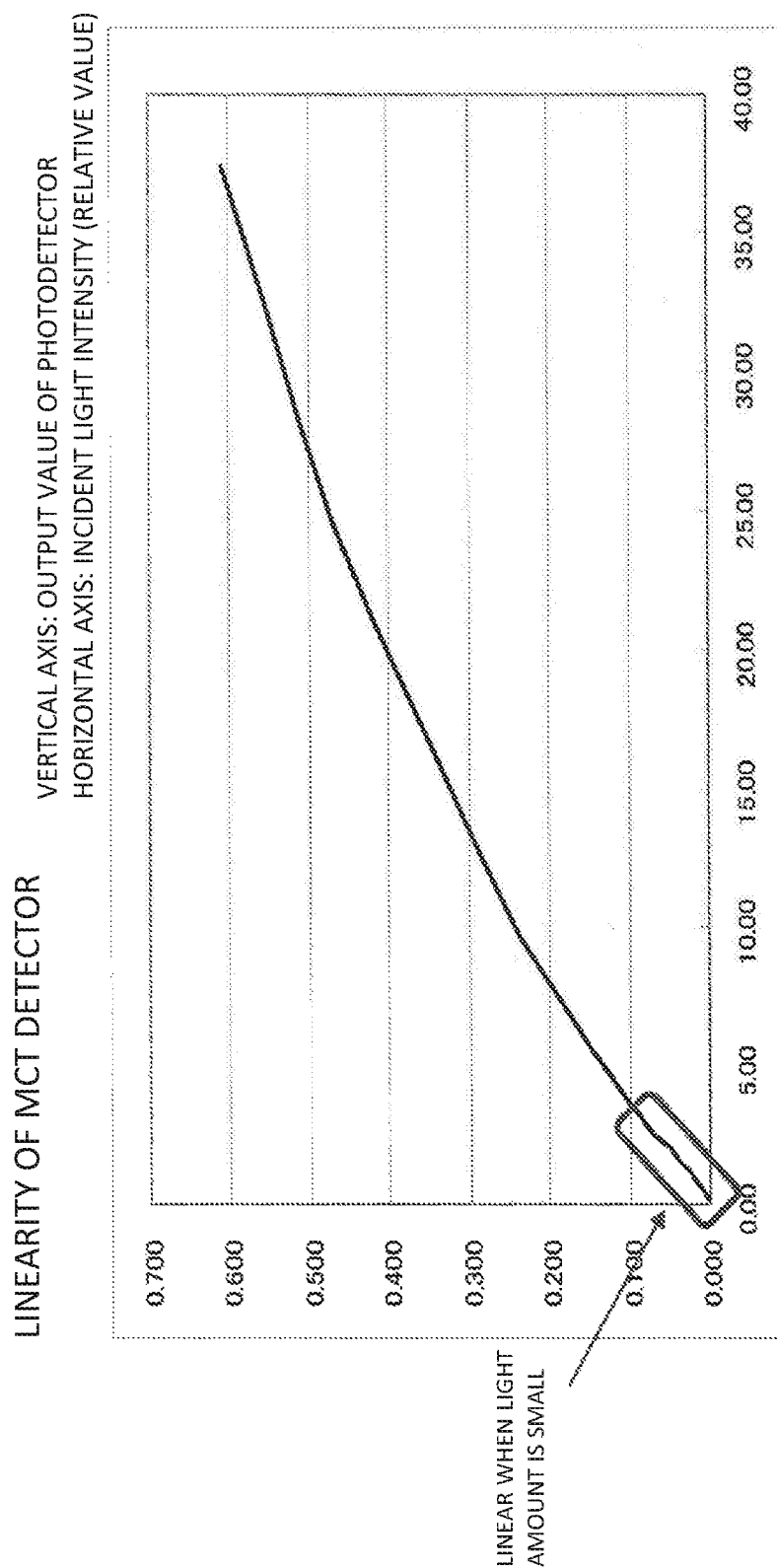
FIG. 1 is a characteristic diagram illustrating the relationship between incident light intensity and the output value of a MCT photodetector.

A spectroscopic analyzer 100 according to one embodiment of the present invention will hereinafter be described with reference to drawings.

The spectroscopic analyzer 100 of the present embodiment is a Fourier transform infrared spectroscopic analyzer 100 referred to as a so-called FTIR. And, it includes a light source 1, an interferometer (spectroscopic part) 2, a sample setting part 3, a photodetector 4, and an arithmetic processing unit 5, as illustrated in FIG. 2.

The light source 1 is one that emits light beams having a broad spectrum (continuous light including light of a number of wavenumbers). For example, it is a tungsten iodine lamp or a high intensity ceramic light source is used.

Figure 2:
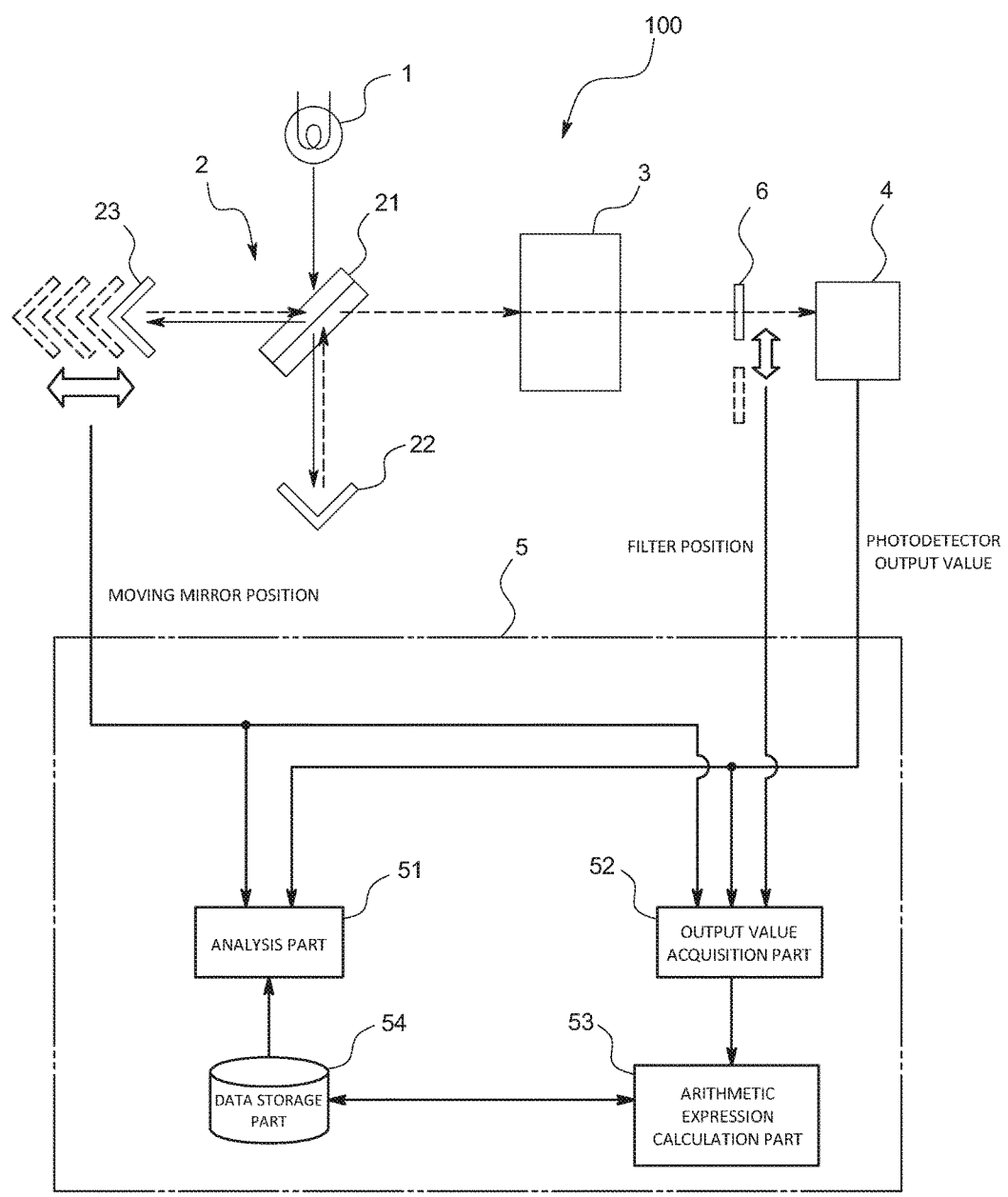
FIG. 2 is a schematic diagram illustrating the whole of a spectroscopic analyzer in one embodiment of the present invention.

As illustrated in FIG. 2, the interferometer 2 is using a so-called Michelson interferometer. It is included a half-mirror (beam splitter) 21, a fixed mirror 22, and a moving mirror 23. The light beams entering the interferometer 2 from the light source 1 is divided into reflected light beams and transmitted light beams by the half-mirror 21. One of the light beams is reflected by the fixed mirror 22, and the other one is reflected by the moving mirror 23. Both of the reflected light beams return to the half-mirror 21 again and are synthesized, and the synthesized light beams are emitted from the interferometer 2.

The sample setting part 3 is herein a cell into which gas (hereinafter also referred to as a sample) as a measuring target is introduced. And, it adapted such that the light beams exiting from the interferometer 2 transmits through the sample inside the sample setting part 3, and is then guided to the photodetector 4.

The photodetector 4 is herein a detector referred to as a so-called MCT photodetector 4.

The arithmetic processing unit 5 is one having: an analog electric circuit having some devices such as a buffer and an amplifier; a digital electric circuit having some devices such as a CPU, a memory, and a DSP; and an A/D converter and the like interposing therebetween. The CPU and its peripheral devices cooperate in accordance with a predetermined program stored in the memory. And, thereby, the arithmetic processing unit 5 functions as an analysis part 51 that calculates a spectrum of the light beams (an optical spectrum) having transmitted through the sample from the output values of the photodetector 4 as well as obtaining light absorbances at respective wavenumbers from the optical spectrum to analyze the sample.

The analysis part 51 calculates the optical spectrum in the following manner.

When observing the intensity of the light beams having passed through the sample while reciprocating the moving mirror 23, in the case of light beams with single wavenumber, the light intensity draws a sine curve by interference, if a horizontal axis as the position of the moving mirror 23. On the other hand, since the actual light beams having transmitted through the sample is the continuous light beams, and the sine curve varies depending on a wavenumber. The intensity of the actual light beams is represented by the superposition of sine curves drawn at respective wavenumbers, and an interference pattern (interferogram) has a wave packet shape.

The analysis part 51 obtains the position of the moving mirror 23 used a range finder (not illustrated) such as a HeNe laser. And, it obtains the light intensities corresponding to the respective positions of the moving mirror 23 using the photodetector 4. And, it performs a fast Fourier transform (FFT) on the interference pattern obtained from the light intensities and the respective positions to thereby convert to the optical spectrum with respective wavenumber components used as a horizontal axis.

When doing this, the intensity of the light beams having transmitted through the sample, i.e., the intensity of the light beams entering the photodetector 4 is calculated on the basis of the output value of the photodetector 4. For this purpose, it is necessary to preliminarily obtain the relationship (calibration curve) between the output value of the photodetector 4 and the incident light intensity to store it in the memory. Note that the calibration curve in this embodiment is an arithmetic expression for converting the output value of the photodetector 4 into the incident light intensity, but may be a table or a map.

Accordingly, in the present embodiment, in order to preliminarily obtain the calibration curve (arithmetic expression), the following mechanism is provided in the spectroscopic analyzer 100.

First, as illustrated in FIG. 2, in an optical path from the sample setting part 3 to the photodetector 4, an optical filter 6 as an optical element is removably inserted.

Figure 3:
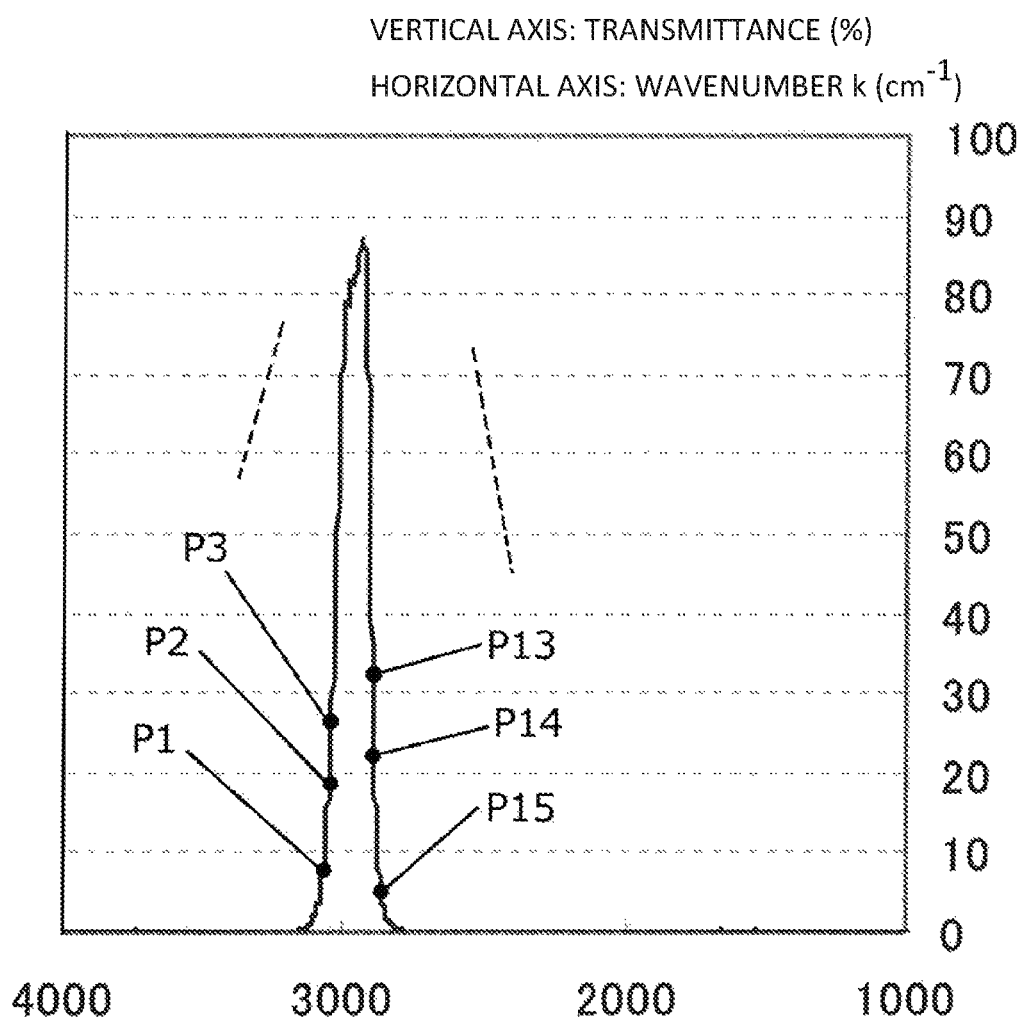
FIG. 3 is a spectrum diagram illustrating the wavenumber transmission characteristics of an optical filter and measurement points in the same embodiment.

The optical filter 6 is a flat plate-shaped one, and herein a so-called band-pass filter. And, it has a wavenumber transmission characteristics that is exemplified as illustrated in FIG. 3.

Figure 4:
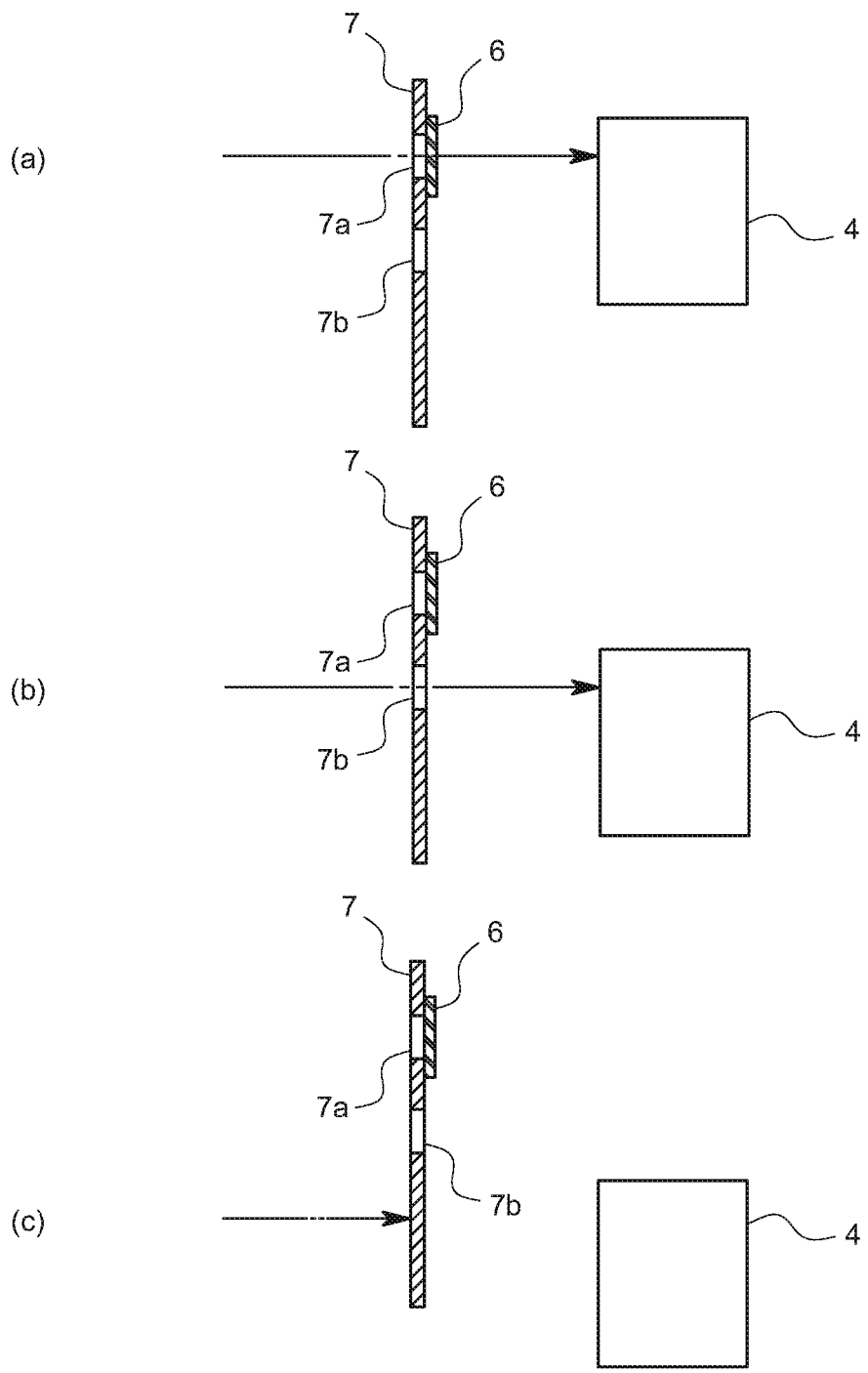
FIG. 4 is an action explanatory diagram illustrating the actions of supporting member of an optical filter (filter supporting member) in the same embodiment.

As schematically illustrated in FIG. 4, the optical filter 6 is movably supported by a filter supporting member 7 that shapes plate-like. And, it is mounted to a housing slidably. In the filter supporting member 7, two light transmission holes 7a and 7b are provided. And, the optical filter 6 is attached on the filter supporting member 7 so as to cover the first light transmission hole 7a.

By sliding the filter supporting member 7, e.g. manually, the optical filter 6 can be selectively positioned in any of a first position where the first light transmission hole 7a, i.e., the optical filter 6 is positioned in the optical path (see FIG. 4(*a*)), a second position where the second light transmission hole 7b is positioned in the optical path (see FIG. 4(*b*)), and a third position where the optical path is blocked by the filter supporting member 7 (see FIG. 4(*c*)).

Also, as illustrated in FIG. 2, the arithmetic processing unit 5 further includes an output value acquisition part 52 and an arithmetic expression calculation part 53.

The output value acquisition part 52 is one that acquires the first output value as the output value of the photodetector 4 at each wavenumber when the light beams exiting from the sample setting part 3 passes through the optical filter 6 and then enters the photodetector 4. And, it acquires the second output value as the output value of the photodetector 4 at each wavenumber when the light beams exiting from the sample setting part 3 directly enters the photodetector 4 without transmitting through the optical filter 6. And, it stores the first and second output values in a data storage part 54 provided in a predetermined area of the memory. The output value acquisition part 52 is also herein adapted to acquire the output value of the photodetector 4 as the third output value when the light beams exiting from the sample setting part 3 is blocked.

The arithmetic expression calculation part 53 is one that uses the wavenumber transmission characteristics of the optical filter 6 preliminarily stored in the data storage part 54 as a parameter, in addition to the first and second output values, and obtains the arithmetic expression for converting the output value of the photodetector 4 into the incident light intensity. And, it stores the arithmetic expression in the data storage part 54.

An example of the actions of the spectroscopic analyzer 100 having such a configuration will be described in detail.

First, the sample setting part 3 is filled with the sample which states such as temperature, component concentration, and pressure, are kept constant. The reason to keep the states constant is to prevent that the spectrum of the light transmitting through the sample from being changed during the calculation of the arithmetic expression. At this time, it is desirable to minimize the overlap between wavenumber of infrared light absorption and transmission of the optical filter. The sample may be, for example, nitrogen gas or air. The sample is not sealed but may be under vacuum.

Then, an operator moves the filter supporting member 7 to the first position to arrange the optical filter 6 in the optical path. After that, when the light source 1 lights and the moving mirror 23 reciprocates, the operator starts a predetermine first arithmetic operation using a mouse, a keyboard, and the like, the output value acquisition part 52 senses the start of the first arithmetic operation, and receive and acquire the output values (interferogram) of the photodetector 4 corresponding to the respective positions of the moving mirror 23. When doing this, the output value acquisition part 52 corrects the offset of the interferogram by subtracting the output values of the photodetector 4 when the filter supporting member 7 is in the third position and the light beams to enter the photodetector 4 is blocked.

After that, the output value acquisition part 52 performs a fast Fourier transform of the interferogram that corrected offset, and calculates the first output value $Y_1(k)$ as the output value of the photodetector 4 at each wavenumber. And, it stores the first output value $Y_1(k)$ in the data storage part 54, and ends an action. Note that k represents a wavenumber.

Subsequently, the operator moves the filter supporting member 7 to the second position to withdraw the optical filter 6 from the optical path. Then, when the operator starts a predetermined second arithmetic operation, the output value acquisition part 52 senses the start of the second arithmetic operation, and acquires the output values (interferogram) of the photodetector 4 corresponding to the respective positions of the moving mirror 23. When doing this, in the same manner as before, the output value acquisition part 52 corrects the offset of the interferogram by subtracting the output values of the photodetector 4 when the filter supporting member 7 is in the third position and the light beams to enter the photodetector 4 is blocked.

After that, the output value acquisition part 52 performs a fast Fourier transform of the interferogram that corrected offset, and calculates the second output value $Y_2(k)$ as the output value of the photodetector 4 at each wavenumber. And, it stores the second output value $Y_2(k)$ in the data storage part 54, and ends an action.

Figure 5:
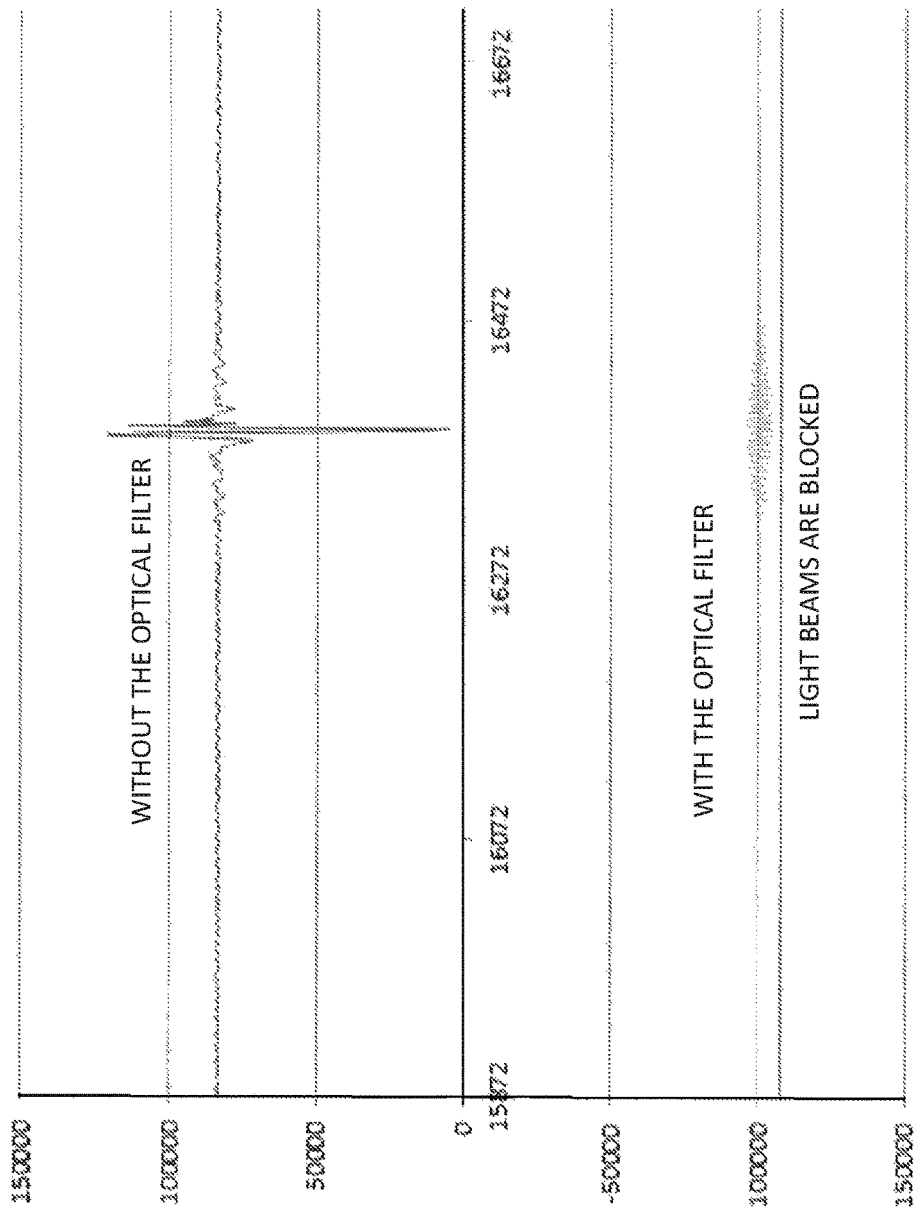
FIG. 5 is a graph illustrating an example of interferograms respectively obtained at a first position (with the optical filter), a second position (without the optical filter), and a third position (light beams are blocked) in the same embodiment.

FIG. 5 illustrates an example of the interferograms obtained when the filter supporting member 7 is in the first position (with the optical filter), the second position (without optical filter), and the third position (light beams are blocked).

Subsequently, the arithmetic expression calculation part 53 acquires the first and second output values $Y_1(k)$ and $Y_2(k)$ at predetermined multiple wavenumbers (here, for example, at 15 points, i.e., P1 to P15 in FIG. 3) from the data storage part 54. And, it obtains the arithmetic expression $C(y)$ which meeting the following evaluation function using an optimization method, for example.

The evaluation function is expressed by Expression (2).

$$Y_1(k)/\{C(y)Y_2(k)\} \cong F(k) \tag{2}$$

In Expression (2), $F(k)$ represents the transmittance of the optical filter 6 at each wavenumber (filter characteristics), and y represents the output value of the photodetector 4. $C(y)$ represents an expression which uses y as a variable and of which the form is predetermined except for the coefficients of the variable. It is expressed, for example, by the following Expression (3).

$$C(y)=C_1 y + C_2 y^2 + C_3 y^3 \tag{3}$$

The arithmetic expression calculation part 53 obtains the coefficients $C_1$ to $C_3$ using the known optimization method. The optimization is performed such that the value of the left-hand side of Expression 2 falls within a predetermined range around the $F(k)$ value of the right-hand side. In addition, the arithmetic expression $C(y)$ obtained in this manner is stored in the data storage part 54.

After that, the analysis part 51 corrects the output values y (interferogram) of the photodetector 4 corresponding to the respective positions of the moving mirror 23 using the arithmetic expression $C(y)$ stored in the data storage part 54. Specifically, the output values y of the photodetector 4 are multiplied by $C(y)$, and it calculates the corrected detector output values x, i.e., the light intensities x. Then, a fast Fourier transform is performed on the corrected detector output values x to calculate an optical spectrum. And, the light absorbance or the like at each wavenumber is obtained from the optical spectrum to analyze the sample.

Next, the following will be described the principle that the corrected detector output values x obtained by correcting the output values y of the photodetector 4 using $C(y)$ are equivalent to the relative light intensities.

The first output value $Y_1(k)$ can be expressed by the following Expression (4).

$$Y_1(k)=S(I_1)F(k)L(k) \tag{4}$$

where $L(k)$ represents the incident light intensity at each wavenumber, $S(I_1)$ represents detector characteristics at each wavenumber, $I_1$ represents the incident light intensity, and $F(k)$ represents the transmittance of the optical filter 6 at each wavenumber (filter characteristics).

The intensity (incident light intensity) $I_1$ of light beams to enter the photodetector 4 is fallen within a predetermined range (herein, equal to or less than a predetermined value) by transmitting through the optical filter 6. "Within the predetermined range" refers to "within a range" where the relationship between the incident light intensity $I_1$ and the output value of the photodetector 4 is linear (within a range where the offset correction is made to achieve a proportional relationship). For example, the range corresponds to a range surrounded by a square in FIG. 1.

Accordingly, the following expression holds.

$$S(I_1)=\alpha=\text{constant value} \tag{5}$$

where $\alpha$ is a coefficient having a constant value.

In other words, the output value of the photodetector 4 obtained when the incident light intensity is within the predetermined range relatively represents the incident light intensity $I_1$.

Note that in this embodiment, the intensity $I_1$ of the incident light beams having transmitted through the optical filter 6 is set to barely fall within the predetermined range. Conversely, when directly guiding the light beams to the photodetector 4 without the optical filter 6, the intensity of the incident light beams is set out of the predetermined range. In doing so, sufficient light intensity for securing the signal-to-noise ratio of the spectroscopic analyzer 100 can be ensured.

On the other hand, the second output value $Y_2(k)$ can be expressed by the following Expression (6).

$$Y_2(k)=S(I_2)L(k) \tag{6}$$

where $I_2$ represents the incident light intensity.

The intensity $I_2$ of the light beams to enter the photodetector 4 may be large because of not transmitting through the optical filter 6, and therefore, has a nonlinear relationship with the second output value $Y_2(k)$ of the photodetector 4.

That is, $S(I_2)$ does not have a constant value, but has a value changing depending on the intensity $I_2$ of the light beams to enter the photodetector 4.

When performing a predetermined arithmetic operation on $S(I_2)$ to make the resulting values equal to $S(I_1)=\alpha$, correction values resulting from the arithmetic operation become proportional to all incident light intensities I, and the correction values represent the relative incident light intensities.

That is, it is only necessary to obtain a function $C'(I)$ meeting the following Expression (7).

$$C'(I)S(I_2)=S(I_1) \tag{7}$$

Therefore, multiplying both sides of Expression (6) by $C'(I)$ gives the following Expression (8).

$$C'(I)Y_2(k)=C'(I)S(I_2)L(k) \tag{8}$$

Dividing the respective sides of Expression (4) by corresponding sides of Expression (8) gives the following Expression (9).

$$Y_1(k)/\{C'(I)Y_2(k)\}=S(I_1)F(k)L(k)/\{C'(I)S(I_2)L(k)\} \tag{9}$$

By substituting Expression (7) into Expression (9), in the right-hand side, $S(I_1)L(k)/\{C'(I)S(I_2)L(k)\}=1$ holds, and therefore Expression (9) finally becomes the following Expression (10).

$$Y_1(k)/\{C'(I)Y_2(k)\}=F(k) \tag{10}$$

$C'(I)$ using the incident light intensity I as a variable can be replaced by $C(y)$ as a function of the output value y of the photodetector 4, and therefore by substituting $C'(I)$ by $C(y)$, the Expression (2) holds.

Figure 6:
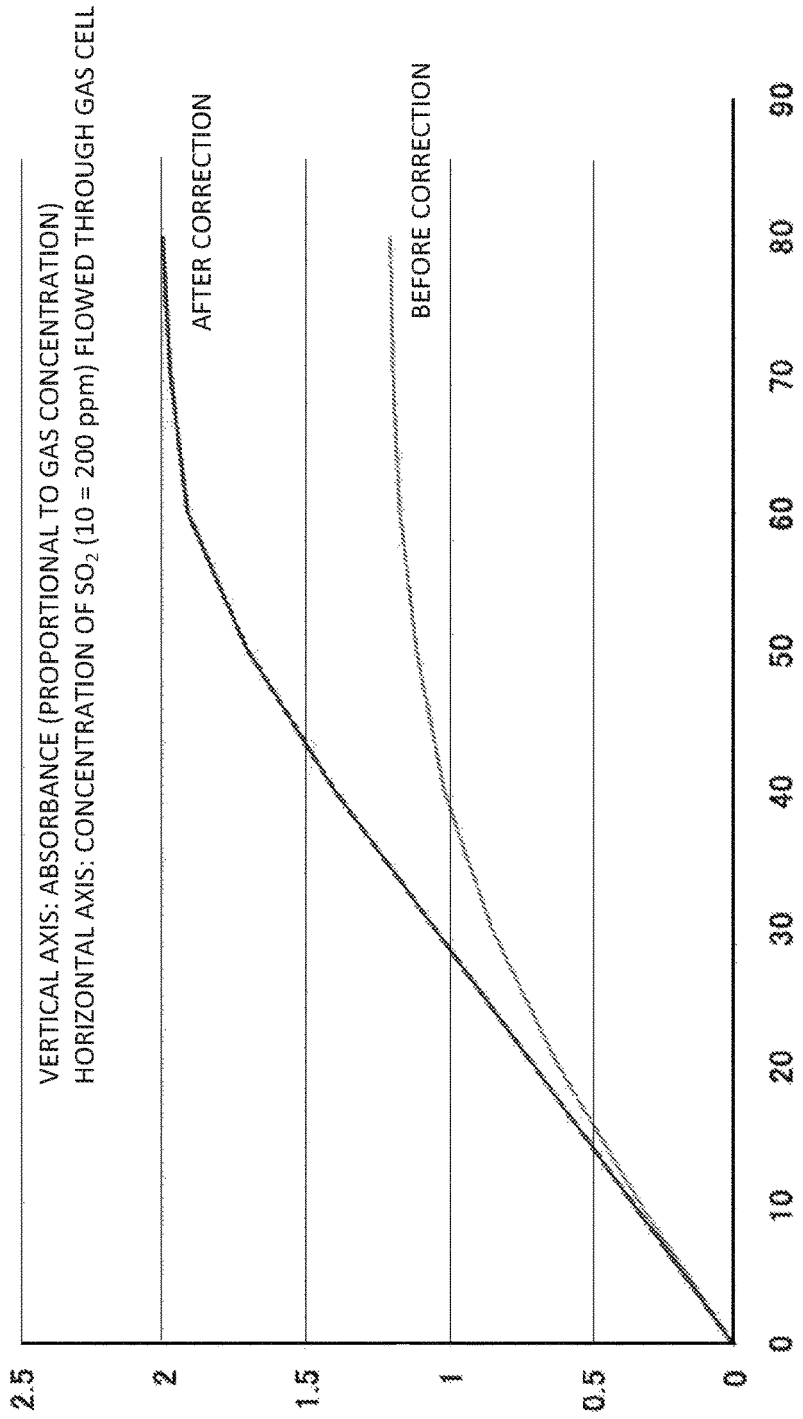
FIG. 6 is a diagram illustrating a result of performing gas analysis using the spectroscopic analyzer of the same embodiment.

This is the reason why the corrected detector output values x obtained by correcting the output values y of the photodetector 4 using $C(y)$ are equivalent to the relative light intensities. A result of improved linearity obtained by actually gas analysis is illustrated in FIG. 6.

According to the present embodiment configured as described, work necessary to obtain the arithmetic expression for calculating the incident light intensity from the output value of the photodetector 4 is only to perform a measurement operation when interposing the optical element and when not interposing the optical element. And, equipment necessary for the work includes only the optical element and its accessories. As a result, an output correction expression for the photodetector 4 used in the spectroscopic analyzer 100, i.e., the arithmetic expression can be prepared in a short period of time with a simple configuration.

In addition, as a result, there is also provided the advantage of being able to easily check or re-prepare a calibration curve at the destination of product delivery at the time of maintenance or repair.

Note that the present invention is not limited to the above-described embodiment. For example, the filter supporting member 7 and the optical filter 6 may be adapted to be detachable, and attached to obtain the arithmetic expression only when the shipment or checking.

The optical element is not only of a transmission type but may be of a reflection type. In short, the optical element is only required to have known wavenumber characteristics, and make the incident light intensity fall within the linearity keeping range of the photodetector.

It may be configured to fully automatically obtain the arithmetic expression by means such as automatically moving the optical filter to any of the first to third positions.

The photodetector is not limited to the MCT photodetector. The present invention can be applied to a photodetector of which the output value is linear when the incident light intensity is within a predetermined range but nonlinear when the incident light intensity is out of the range.

Also, the present invention is not limited to the Fourier transform infrared spectroscopic analyzer, but can be applied to another type of spectroscopic analyzer or a spectroscope (in the above-described embodiment, one having a configuration before obtaining the optical spectrum) to produce the same effect.

Besides, the present invention is not limited to any of the above-described embodiments but can be variously modified without departing from the scope thereof.

REFERENCE SIGNS LIST

100: Spectroscopic analyzer
1: Light source
2: Spectroscopic part (interferometer)
4: Photodetector
52: Output value acquisition part
53: Arithmetic expression calculation part
6: Optical filter (optical element)
7: Filter supporting member (supporting mechanism)

What is claimed is:

1. A photodetector output correction method used for a spectroscopic analyzer or a spectroscope comprising: a light source, a spectroscopic part that disperses light beams emitted from the light source, and a photodetector for measuring intensity of light beams exiting from the spectroscopic part, wherein the photodetector is adapted such that a relationship between incident light intensity and an output value is substantially linear within a predetermined range, the photodetector output correction method comprising:

making the light beams emitted from the light source enter the photodetector interposing an optical element having a known wavenumber transmission characteristic or a known wavenumber reflection characteristic so as to make intensity of the light beams fall within the range, and acquiring a first output value as an output value of the photodetector with respect to each of light beams that have predetermined multiple wavenumbers and are included in the incident light beams;

making the light beams emitted from the light source enter the photodetector without interposing the optical element, and acquiring a second output value as an output value of the photodetector with respect to each of light beams that respectively have the predetermined wavenumbers and are included in the incident light beams; and using a ratio between the first output value and the second output value at each of the predetermined wavenumbers and the wavenumber transmission characteristic or wavenumber reflection characteristic of the optical element as parameters to obtain an arithmetic expression for calculating intensity of incident light beams from an output value of the photodetector.

2. The photodetector output correction method according to claim 1, wherein given that the arithmetic expression is C(y), the arithmetic expression C(y) is determined such that a value of the following Expression 1 falls within a predetermined range around F(k) that is a value indicating the wavenumber transmission characteristic or the wavenumber reflection characteristic of the optical element, $$Y_1(k)/\{C(y)Y_2(k)\} \quad (1)$$

where k represents a wavenumber, $Y_1(k)$ represents the first output value, $Y_2(k)$ represents the second output value, F(k) represents the wavenumber transmission characteristic or the wavenumber reflection characteristic of the optical element, y represents the output value of the photodetector, and C(y) represents the arithmetic expression.

3. A spectroscopic analyzer or a spectroscope comprising: a light source, a spectroscopic part that disperses light beams emitted from the light source, and a photodetector that detects light beams exiting from the spectroscopic part, wherein the photodetector is adapted such that a relationship between incident light intensity and an output value is substantially linear within a predetermined range, the spectroscopic analyzer or the spectroscope further comprising:

an output value acquisition part that when making the light beams emitted from the light source enter the photodetector interposing an optical element having a known wavenumber transmission characteristic or a known wavenumber reflection characteristic so as to make intensity of the light beams fall within the range, acquires a first output value as an output value of the photodetector with respect to each of light beams that have predetermined multiple wavenumbers and are included in the incident light beams, and also when making the light beams emitted from the light source enter the photodetector without interposing the optical element, acquires a second output value as an output value of the photodetector with respect to each of light beams that respectively have the predetermined wavenumbers and are included in the incident light beams; and an arithmetic expression calculation part that uses a ratio between the first output value and the second output value at each of the predetermined wavenumbers and the wavenumber transmission characteristic or the wavenumber reflection characteristic of the optical element as parameters to calculate an arithmetic expression for calculating intensity of incident light beams from an output value of the photodetector.

4. The spectroscopic analyzer or the spectroscope according to claim 3, further comprising a supporting mechanism that movably supports the optical element, wherein the supporting mechanism that selectively moves the optical element to any of a first position where the optical element is positioned in a optical path from the light source to the photodetector and a second position where the optical element is withdrawn from the optical path.

5. The spectroscopic analyzer or the spectroscope according to claim 3, wherein the optical element is a band-pass filter.

6. A non-transitory computer readable storage medium storing a program used for a spectroscopic analyzer or a spectroscope comprising a light source, a spectroscopic part that disperses light beams emitted from the light source, and a photodetector that detects light beams exiting from the spectroscopic part, wherein the photodetector is adapted such that a relationship between incident light intensity and an output value is substantially linear within a predetermined range, the program when executed instructing the spectroscopic analyzer or the spectroscope to fulfill functions of:

making the light beams emitted from the light source enter the photodetector interposing an optical element having a known wavenumber transmission characteristic or a known wavenumber reflection characteristic so as to make intensity of the light beams fall within the range, and acquiring a first output value as an output value of the photodetector with respect to each of light beams that have predetermined multiple wavenumbers and are included in the incident light beams;

making the light beams emitted from the light source enter the photodetector without interposing the optical element, and acquiring a second output value as an output value of the photodetector with respect to each of light beams that respectively have the predetermined wavenumbers and are included in the incident light beams; and using a ratio between the first output value and the second output value at each of the predetermined wavenumbers and the wavenumber transmission characteristic or the wavenumber reflection characteristic of the optical element as parameters to obtain an arithmetic expression for calculating intensity of incident light beams from an output value of the photodetector.

\* \* \* \* \*